United States Patent
Martens

(10) Patent No.: US 9,311,490 B2
(45) Date of Patent: Apr. 12, 2016

(54) DELIVERY OF CONTEXTUAL DATA TO A COMPUTING DEVICE WHILE PRESERVING DATA PRIVACY

(71) Applicant: MOTOROLA MOBILITY LLC, Chicago, IL (US)

(72) Inventor: Johannes Peter Wilhelm Martens, Munich (DE)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

(21) Appl. No.: 14/302,452

(22) Filed: Jun. 12, 2014

(65) Prior Publication Data

US 2015/0113639 A1    Apr. 23, 2015

Related U.S. Application Data

(60) Provisional application No. 61/893,870, filed on Oct. 21, 2013.

(51) Int. Cl.
  *G06F 21/60* (2013.01)
  *H04L 12/58* (2006.01)
  *H04L 29/06* (2006.01)

(52) U.S. Cl.
  CPC .............. *G06F 21/60* (2013.01); *H04L 51/04* (2013.01); *H04L 63/0428* (2013.01); *H04L 63/105* (2013.01)

(58) Field of Classification Search
  CPC ............ H04L 63/1408; H04L 63/1425; G06F 2221/033; G06F 21/57; G06F 2221/034
  See application file for complete search history.

(56) References Cited

U.S. PATENT DOCUMENTS 8,265,708 B2 *  9/2012  Lee .................. H04M 1/56
                                           340/407.1
8,326,630 B2  12/2012  Chandrasekar et al.
(Continued)

FOREIGN PATENT DOCUMENTS

WO    2011007262 A1    1/2011
WO    2013102915 A2    7/2013

OTHER PUBLICATIONS

International Search Report and Written Opinion of International Application No. PCT/US2014/052954, mailed Nov. 20, 2014 12 pp.

*Primary Examiner* — Yonas Bayou
(74) *Attorney, Agent, or Firm* — Shumaker & Sieffert, P.A.

(57) ABSTRACT

A method, device, system, or article of manufacture is provided for improved delivery of contextual data to a computing device while preserving data privacy. In one embodiment, a method comprises sending, from a first computing device, to a second computing device, first communication data; receiving, at the first computing device, from the second computing device, second communication data; in response to determining that a data privacy attribute of the second computing device is the same as a predetermined data privacy attribute, determining to protect the second communication data, including: converting the first communication data to a first set of text; converting the second communication data to a second set of text; and applying a privacy filter to the first set of text to generate a first set of filtered text, wherein the privacy filter removes any text that is associated with the second set of text; determining a first keyword from the first set of filtered text; sending, from the first computing device, to a computer, the first keyword; and receiving, at the first computing device, from the computer, contextual data associated with the first keyword.

32 Claims, 4 Drawing Sheets

(56) References Cited

U.S. PATENT DOCUMENTS

| | | |
|---|---|---|
| 8,494,851 B2 | 7/2013 | DeLuca et al. |
| 8,612,211 B1 | 12/2013 | Shires et al. |
| 9,106,447 B2 * | 8/2015 | Lee .................. H04L 12/58 |
| 9,123,062 B1 * | 9/2015 | Delker ............ G06Q 30/0269 |
| 2002/0049786 A1 * | 4/2002 | Bibliowicz ........ G06F 3/0481 715/211 |
| 2002/0124187 A1 * | 9/2002 | Lyle ................ H04L 63/1416 726/22 |
| 2007/0011155 A1 * | 1/2007 | Sarkar ............ G06F 17/30722 |
| 2007/0124312 A1 * | 5/2007 | Simpson ............ G06Q 10/107 |
| 2007/0271340 A1 | 11/2007 | Goodman et al. |
| 2008/0109406 A1 * | 5/2008 | Krishnasamy ....... G06Q 10/107 |
| 2008/0254774 A1 * | 10/2008 | Lee .................... H04M 3/4285 455/414.1 |
| 2009/0172111 A1 * | 7/2009 | Jones .................... H04L 51/04 709/206 |
| 2009/0248809 A1 * | 10/2009 | Yedavilli ............. H04L 12/66 709/206 |
| 2011/0093455 A1 * | 4/2011 | Benyamin ............ H04L 12/58 707/723 |
| 2012/0158853 A1 * | 6/2012 | Baartman ........... H04L 12/581 709/206 |

\* cited by examiner

DELIVERY OF CONTEXTUAL DATA TO A COMPUTING DEVICE WHILE PRESERVING DATA PRIVACY

FIELD OF USE

The embodiments described herein relate to delivery of contextual data to computing devices and more particularly to improved delivery of contextual data to a computing device while preserving data privacy.

BACKGROUND

Mobile communications services such as wireless telephony, wireless data services, wireless short message services (SMS), wireless e-mail and the like are typically used for business and personal purposes. These services provide real-time or near real-time delivery of electronic communications, which make them amenable for use in delivering contextual data to a computing device. Further, increasing concerns over data privacy presents additional challenges to the use of mobile communications services in delivering contextual data to a computing device. Accordingly, there is a need for improved techniques to allow for improved delivery of contextual data to a computing device while preserving data privacy. In addition, other desirable features and characteristics of the present disclosure will become apparent from the subsequent detailed description and claims, taken in conjunction with the accompanying figures and the foregoing technical field and background.

BRIEF DESCRIPTION OF THE FIGURES

The present disclosure is illustrated by way of examples, embodiments and the like and is not limited by the accompanying figures, in which like reference numbers indicate similar elements. Elements in the figures are illustrated for simplicity and clarity and have not necessarily been drawn to scale. The figures along with the detailed description are incorporated and form part of the specification and serve to further illustrate examples, embodiments and the like, and explain various principles and advantages, in accordance with the present disclosure, where.

DETAILED DESCRIPTION

Figure 1:
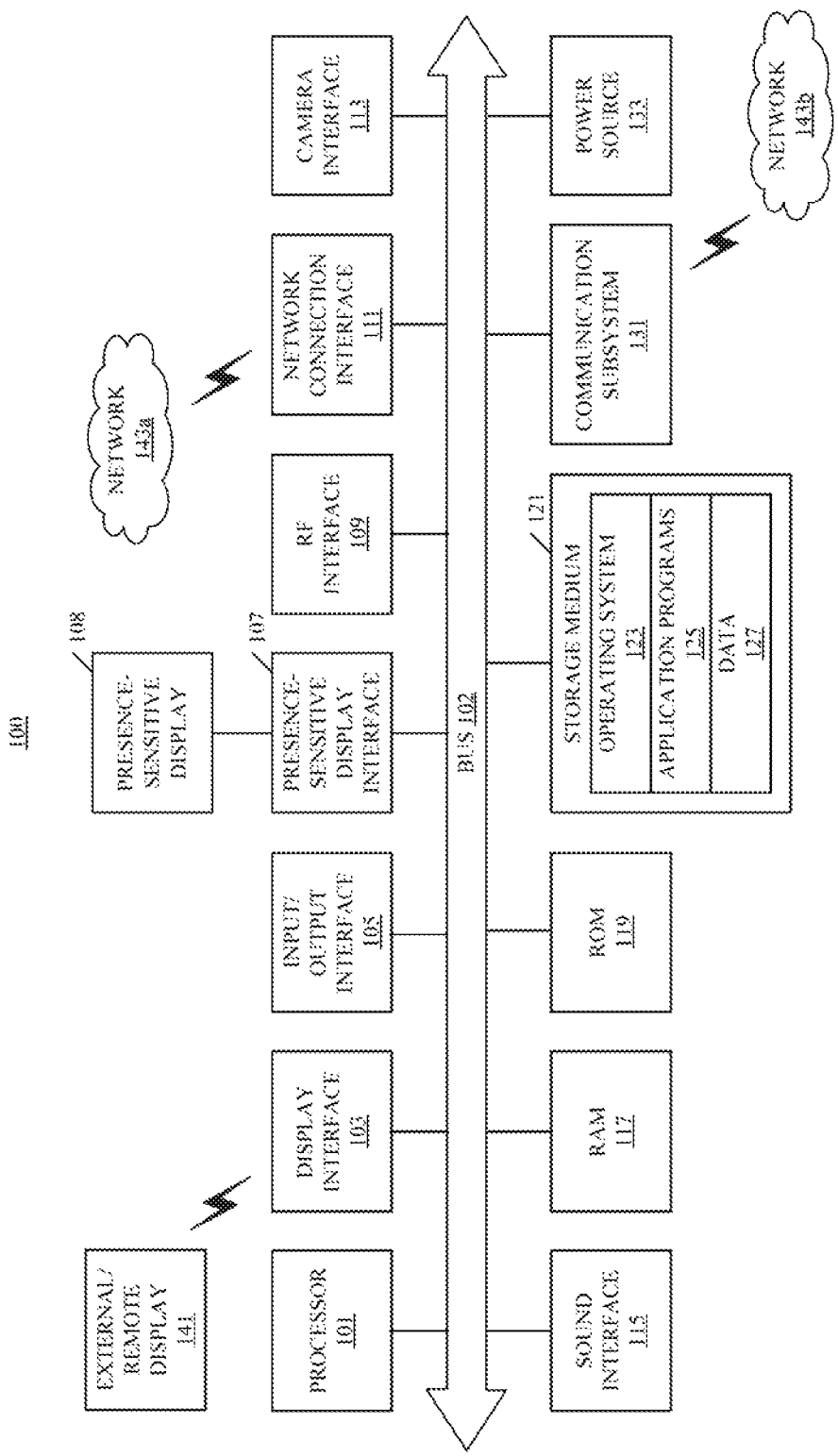
FIG. 1 is a block diagram illustrating one embodiment of a computing device in accordance with various aspects set forth herein.

This disclosure provides example methods, devices, systems, or articles of manufacture for improved delivery of contextual data to a computing device while preserving data privacy. By configuring a computing device in accordance with various aspects described herein, increased usability of the computing device is provided. For example, a first smartphone and a second smartphone may be conducting a voice call. The second smartphone may be operating with data privacy enabled. During the voice call, the first smartphone may convert its user's speech to text. Since the second smartphone has data privacy enabled, the first smartphone may not convert the second smartphone user's speech to text. Thus, the first smartphone may only analyze its user's text to determine any keywords. The first smartphone may send the keywords to a server. The first smartphone may receive from the server contextual data associated with the keywords.

In another example, a first smartphone and a second smartphone may be conducting a voice call. Each smartphone may have data privacy disabled. During the voice call, the first smartphone may convert its user's speech to text. Since the second smartphone has data privacy disabled, the first smartphone may convert the second smartphone user's speech to text. The first smartphone may analyze its user's text and the second smartphone user's text to determine keywords. The first smartphone may send the keywords to a server. The first smartphone may receive from the server contextual data associated with the keywords.

In another example, a first smartphone and a second smartphone may be conducting a voice call. The second smartphone may be operating with data privacy enabled. During the voice call, the first smartphone may convert its user's speech to text. Further, the first smartphone may convert the second smartphone user's speech to text. Since the second smartphone has data privacy enabled, the first smartphone may apply a privacy filter to its user's text to extract any text that repeats or is associated with the second smartphone user's text. The first smartphone may analyze its user's filtered text to determine keywords. The first smartphone may send the keywords to a server. The first smartphone may receive from the server contextual data associated with the keywords.

In some instances, a graphical user interface may be referred to as an object-oriented user interface, an application oriented user interface, a web-based user interface, a touch-based user interface, or a virtual keyboard. A presence-sensitive input device as discussed herein, may be a device that accepts input by the proximity of a finger, a stylus, or an object near the device. Additionally, a presence-sensitive input device may be combined with a display to provide a presence-sensitive display. For example, a user may provide an input to a computing device by touching the surface of a presence-sensitive display using a finger. In another example, a user may provide input to a computing device by gesturing without physically touching any object. For example, a gesture may be received via a video camera or depth camera.

In some instances, a presence-sensitive display can have two main attributes. First, it may enable a user to interact directly with what is displayed, rather than indirectly via a pointer controlled by a mouse or touchpad. Secondly, it may allow a user to interact without requiring any intermediate device that would need to be held in the hand. Such displays may be attached to computers, or to networks as terminals. Such displays may also play a prominent role in the design of digital appliances such as the personal digital assistant (PDA), satellite navigation devices, mobile phones, and video games. Further, such displays may include a capture device and a display.

According to one example implementation, the terms computing device or mobile computing device, as used herein, may be a central processing unit (CPU), controller or processor, or may be conceptualized as a CPU, controller or processor (for example, the processor 101 of FIG. 1). In yet other instances, a computing device may be a CPU, controller or processor combined with one or more additional hardware components. In certain example implementations, the computing device operating as a CPU, controller or processor may be operatively coupled with one or more peripheral devices, such as a display, navigation system, stereo, entertainment center, Wi-Fi access point, or the like. In another example implementation, the term computing device or mobile computing device, as used herein, may refer to a mobile communication device, such as a smartphone, mobile station (MS), terminal, cellular phone, cellular handset, personal digital assistant (PDA), smartphone, wireless phone, organizer, handheld computer, desktop computer, laptop computer, tablet computer, set-top box, television, appliance, game device, medical device, display device, or some other like terminology. In an example embodiment, the computing device may output content to its local display or speaker(s). In another example implementation, the computing device may output content to an external display device (e.g., over Wi-Fi) such as a TV or an external computing system. For any example embodiment herein that may use, access or transfer privacy data, a user has the ability to opt-in or opt-out of sharing the privacy data.

FIG. 1 is a block diagram illustrating one embodiment of a computing device 100 in accordance with various aspects set forth herein. In FIG. 1, the computing device 100 may be configured to include a processor 101, which may also be referred to as a computing device, that is operatively coupled to a display interface 103, an input/output interface 105, a presence-sensitive display interface 107, a radio frequency (RF) interface 109, a network connection interface 111, a camera interface 113, a sound interface 115, a random access memory (RAM) 117, a read only memory (ROM) 119, a storage medium 121, an operating system 123, an application program 125, data 127, a communication subsystem 131, a power source 133, another element, or any combination thereof. In FIG. 1, the processor 101 may be configured to process computer instructions and data. The processor 101 may be configured to be a computer processor or a controller. For example, the processor 101 may include two computer processors. In one definition, data is information in a form suitable for use by a computer. It is important to note that a person having ordinary skill in the art will recognize that the subject matter of this disclosure may be implemented using various operating systems or combinations of operating systems.

In FIG. 1, the display interface 103 may be configured as a communication interface and may provide functions for rendering video, graphics, images, text, other information, or any combination thereof on the display. In one example, a communication interface may include a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof. In one example, the display interface 103 may be operatively coupled to a local display, such as a touch-screen display associated with a mobile device. In another example, the display interface 103 may be configured to provide video, graphics, images, text, other information, or any combination thereof for an external/remote display 141 that is not necessarily connected to the computing device. In one example, a desktop monitor may be utilized for mirroring or extending graphical information that may be presented on a mobile device. In another example, the display interface 103 may wirelessly communicate, for example, via the network connection interface 111 such as a Wi-Fi transceiver to the external/remote display 141.

In the current embodiment, the input/output interface 105 may be configured to provide a communication interface to an input device, output device, or input and output device. The computing device 100 may be configured to use an output device via the input/output interface 105. A person of ordinary skill will recognize that an output device may use the same type of interface port as an input device. For example, a USB port may be used to provide input to and output from the computing device 100. The output device may be a speaker, a sound card, a video card, a display, a monitor, a printer, an actuator, an emitter, a smartcard, another output device, or any combination thereof. The computing device 100 may be configured to use an input device via the input/output interface 105 to allow a user to capture information into the computing device 100. The input device may include a mouse, a trackball, a directional pad, a trackpad, a presence-sensitive input device, a presence-sensitive display, a scroll wheel, a digital camera, a digital video camera, a web camera, a microphone, a sensor, a smartcard, and the like. The presence-sensitive input device may include a digital camera, a digital video camera, a web camera, a microphone, a sensor, or the like to sense input from a user. The presence-sensitive input device may be combined with a display to form a presence-sensitive display. Further, the presence-sensitive input device may be coupled to the computing device. The sensor may be, for instance, an accelerometer, a gyroscope, a tilt sensor, a force sensor, a magnetometer, an optical sensor, a proximity sensor, another like sensor, or any combination thereof. For example, the input device 115 may be an accelerometer, a magnetometer, a digital camera, a microphone, and an optical sensor.

In FIG. 1, the presence-sensitive display interface 107 may be configured to provide a communication interface to a pointing device or a presence-sensitive display 108 such as a touch screen. In one definition, a presence-sensitive display is an electronic visual display that may detect the presence and location of a touch, gesture, or object near its display area. In one definition, the term "near" means on, proximate or associated with. In another definition, the term "near" is the extended spatial location of. The RF interface 109 may be configured to provide a communication interface to RF components such as a transmitter, a receiver, and an antenna. The network connection interface 111 may be configured to provide a communication interface to a network 143a. The network 143a may encompass wired and wireless communication networks such as a local-area network (LAN), a wide-area network (WAN), a computer network, a wireless network, a telecommunications network, another like network or any combination thereof. For example, the network 143a may be a cellular network, a Wi-Fi network, and a near-field network. As previously discussed, the display interface 103 may be in communication with the network connection interface 111, for example, to provide information for display on a remote display that is operatively coupled to the computing device 100. The camera interface 113 may be configured to provide a communication interface and functions for capturing digital images or video from a camera. The sound interface 115 may be configured to provide a communication interface to a microphone or speaker.

In this embodiment, the RAM 117 may be configured to interface via the bus 102 to the processor 101 to provide storage or caching of data or computer instructions during the execution of software programs such as the operating system, application programs, and device drivers. In one example, the computing device 100 may include at least one hundred and twenty-eight megabytes (128 Mbytes) of RAM. The ROM 119 may be configured to provide computer instructions or data to the processor 101. For example, the ROM 119 may be configured to be invariant low-level system code or data for basic system functions such as basic input and output (I/O), startup, or reception of keystrokes from a keyboard that are stored in a non-volatile memory. The storage medium 121 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives. In one example, the storage medium 121 may be configured to include an operating system 123, an application program 125 such as a web browser application, a widget or gadget engine or another application, and a data file 127.

In FIG. 1, the computing device 101 may be configured to communicate with a network 143b using the communication subsystem 131. The network 143a and the network 143b may be the same network or networks or different network or networks. The communication functions of the communication subsystem 131 may include data communication, voice communication, multimedia communication, short-range communications such as Bluetooth, near-field communication, location-based communication such as the use of the global positioning system (GPS) to determine a location, another like communication function, or any combination thereof. For example, the communication subsystem 131 may include cellular communication, Wi-Fi communication, Bluetooth communication, and GPS communication. The network 143b may encompass wired and wireless communication networks such as a local-area network (LAN), a wide-area network (WAN), a computer network, a wireless network, a telecommunications network, another like network or any combination thereof. For example, the network 143b may be a cellular network, a Wi-Fi network, and a near-field network. The power source 133 may be configured to provide an alternating current (AC) or direct current (DC) power to components of the computing device 100.

In FIG. 1, the storage medium 121 may be configured to include a number of physical drive units, such as a redundant array of independent disks (RAID), a floppy disk drive, a flash memory, a USB flash drive, an external hard disk drive, thumb drive, pen drive, key drive, a high-density digital versatile disc (HD-DVD) optical disc drive, an internal hard disk drive, a Blu-Ray optical disc drive, a holographic digital data storage (HDDS) optical disc drive, an external mini-dual in-line memory module (DIMM) synchronous dynamic random access memory (SDRAM), an external micro-DIMM SDRAM, a smartcard memory such as a subscriber identity module or a removable user identity (SIM/RUIM) module, other memory, or any combination thereof. The storage medium 121 may allow the computing device 100 to access computer-executable instructions, application programs or the like, stored on transitory or non-transitory memory media, to off-load data, or to upload data. An article of manufacture, such as one utilizing a communication system may be tangibly embodied in storage medium 122, which may comprise a computer-readable medium.

Figure 2:
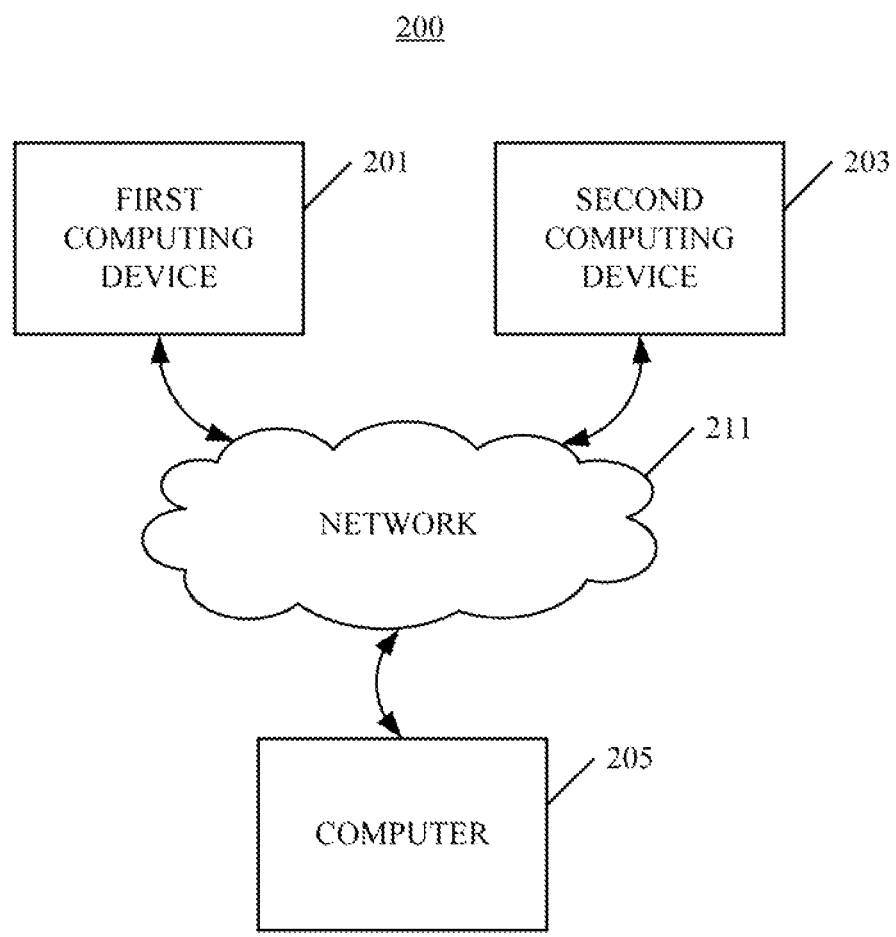
FIG. 2 illustrates one embodiment of a system for improved delivery of contextual data to a computing device while preserving data privacy with various aspects described herein.

FIG. 2 illustrates one embodiment of a system 200 for improved delivery of contextual data to a computing device while preserving data privacy with various aspects described herein. In FIG. 2, the system 200 may be configured to include a first computing device 201, a second computing device 203, a computer 205, and a network 211. The computer 205 may be configured to include a computer software system. In one example, the computer 205 may be a computer software system executing on a computer hardware system. The computer 205 may execute one or more services. Further, the computer 205 may include one or more computer programs running to serve requests or provide data to local computer programs executing on the computer 205 or remote computer programs executing on computing devices. The computer 205 may be capable of performing functions associated with a server such as a database server, a file server, a mail server, a print server, a web server, a gaming server, the like, or any combination thereof, whether in hardware or software. In one example, the computer 205 may be a web server. In another example, the computer 205 may be a file server. The computer 205 may be configured to process requests or provide data to computing devices over a network 211. The network 211 may include wired or wireless communication networks such as a local-area network (LAN), a wide-area network (WAN), a computer network, a wireless network, a telecommunications network, the like or any combination thereof. In one example, the network 211 may be a cellular network, a Wi-Fi network, and the Internet. The first computing device 201 may communicate with the second computing device 203 or the computer 205 using the network 211. Similarly, the second computing device 203 may communicate with the first computing device 201 or the computer 205 using the network 211.

In FIG. 2, the first computing device 201 may refer to a mobile communication device, such as a smartphone, mobile station (MS), terminal, cellular phone, cellular handset, personal digital assistant (PDA), wireless phone, organizer, handheld computer, desktop computer, laptop computer, tablet computer, set-top box, television, appliance, game device, medical device, display device, or the like. Similarly, the second computing device 203 may refer to a mobile communication device, such as a smartphone, mobile station (MS), terminal, cellular phone, cellular handset, personal digital assistant (PDA), wireless phone, organizer, handheld computer, desktop computer, laptop computer, tablet computer, set-top box, television, appliance, game device, medical device, display device, or the like.

In one embodiment, the first computing device 201 may be configured to send first communication data to the second computing device 203. In one example, the first communication data may be speech data, short message service (SMS) data, e-mail data, image data, video data, video conference data, or the like. Further, the first computing device 201 may be configured to receive second communication data from the second computing device 203. In one example, the second communication data may be speech data, SMS data, e-mail data, image data, video data, video conference data, or the like. The first computing device 201 may determine a first keyword associated with the first communication data. The first keyword may be data extracted or derived from the first communication data. In one example, the first communication data such as speech data may be converted to a first set of text and the first keyword may be selected or derived from all or a portion of the first set of text. In another example, the first communication data such as SMS data may be analyzed and the first keyword may be selected or derived from all or a portion of the SMS data. In another example, the first communication data such as video data may be analyzed and the first keyword may be one or more frames of video data. A person of ordinary skill in the art will recognize various techniques for identifying keywords in communication data.

In the current embodiment, in response to determining that a data privacy attribute of the second computing device is the same as a predetermined data privacy attribute, the first computing device 201 may be configured to determine to protect the second communication data. In one example, the predetermined data privacy attribute may be associated with all or a portion of the second communication data being private data, wherein the first computing device 201 receiving the second communication data may not be authorized to analyze the second communication data. The first computing device 201 may send the first keyword to the computer 205 using the network 211. The computer 205 may receive the first keyword from the first computing device. Further, the computer 205 may be configured to include a context engine. The context engine of the computer 205 may analyze the first keyword to generate contextual data. In one example, the context engine of the computer 205 may analyze the first keyword in conjunction with any historical data associated with the first computing device 201 such as previous keywords to infer the contextual data. A person of ordinary skill in the art will recognize various techniques for inferring contextual data using a keyword or historical data. The context engine may perform real-time or near real-time processing of the first keyword in conjunction with any historical data associated with the first computing device 201 to infer the contextual data. Further, the context engine may perform adaptive analysis of the first keyword in conjunction with any historical data associated with the first computing device 201 to infer the contextual data.

Furthermore, the contextual data may be any data associated with the first keyword. Further, the contextual data may be text, an image, a web page, a uniform resource locator (URL) associated with a web page, a phone number, an address, a GPS coordinate, audio, video, the like, or any combination thereof. In one example, the contextual data may be an inferred contextual state of the first computing device 201 associated with the first keyword. In another example, the contextual data may be a recommendation for a task to be performed by the first computing device 201 such as a recommendation to schedule a meeting, send an e-mail, record a task, place a phone call, send an SMS message, record a reminder, get navigation directions, open an application, the like, or any combination thereof. The first computing device 201 may receive from the computer 205 using the network 211 the contextual data associated with the first keyword. The first computing device 201 may process the contextual data by, for instance, presenting all or a portion of the contextual data, activating an application associated with the contextual data, displaying a notification associated with the contextual data, performing a task associated with the contextual data, the like, or any combination thereof.

In another embodiment, the computing device 200 may convert the first communication data to a first set of text. Similarly, the computing device 200 may convert the second communication data to a second set of text. The computing device 200 may apply a privacy filter to the first set of text to remove any text that is associated with the second set of text. A person of ordinary skill in the art will recognize various techniques associated with applying privacy filters to data. The computing device 200 may determine the first keyword from the first set of text.

In another embodiment, the computing device 200 may receive, from a presence-sensitive display, an indication of a command. In response to the command being a predetermined command, the computing device 200 may determine the first keyword associated with the first communication data.

In another embodiment, each of the first communication data and the second communication data may be speech data.

In another embodiment, each of the first communication data and the second communication data may be SMS data.

In another embodiment, the predetermined data privacy attribute may correspond to the second communication data being private data.

In another embodiment, the computing device 200 may convert the first communication data to a first set of text. Further, the computing device 200 may determine the first keyword associated with the first set of text.

In another embodiment, the computing device 200 may receive, from the computing device, the data privacy attribute of the computing device. Further, the computing device 200 may determine that the data privacy attribute of the computing device is associated with a predetermined data privacy attribute.

In another embodiment, the computing device 200 may determine not to convert the second communication data to a second set of text.

In another embodiment, the computing device 200 may convert the second communication data to a second set of text. Further, the computing device 200 may determine not to extract any keywords from the second set of text.

In another embodiment, the first computing device 201 may be configured to send first communication data to the second computing device 203. Further, the first computing device 201 may be configured to receive second communication data from the second computing device 203. The first computing device 201 may determine a first keyword associated with the first communication data. In one example, the first communication data such as e-mail data may be analyzed and the first keyword may be selected or derived from all or a portion of the e-mail data. In response to determining that a data privacy attribute of the second computing device is the same as a predetermined data privacy attribute, the first computing device 201 may be configured to determine a second keyword from the second communication data. In one example, the predetermined data privacy attribute may be associated with all or a portion of the second communication data being non-private data, wherein the first computing device receiving the second communication data may be authorized to analyze the second communication data to determine or extract any keywords from the second communication data. The first computing device 201 may send the first keyword and the second keyword to the computer 205 using the network 211.

In this embodiment, the computer 205 may receive the first keyword and the second keyword from the first computing device. Further, the computer 205 may be configured to include a context engine. The context engine of the computer 205 may analyze the first keyword or the second keyword to generate contextual data. In one example, the context engine of the computer 205 may analyze the first keyword in conjunction with any historical data associated with the first computing device 201 such as previous keywords or previous contextual data. Similarly, the context engine of the computer 205 may analyze the second keyword in conjunction with any historical data associated with the first computing device 201 such as previous keywords or previous contextual data. Contextual data may be any data related to the first keyword or the second keyword. The first computing device 201 may process the contextual data by, for instance, displaying or playing all or a portion of the contextual data, activating an application residing on the first computing device 201, displaying a notification associated with the contextual data, performing a task by the first computing device 201, the like, or any combination thereof.

Figure 3:
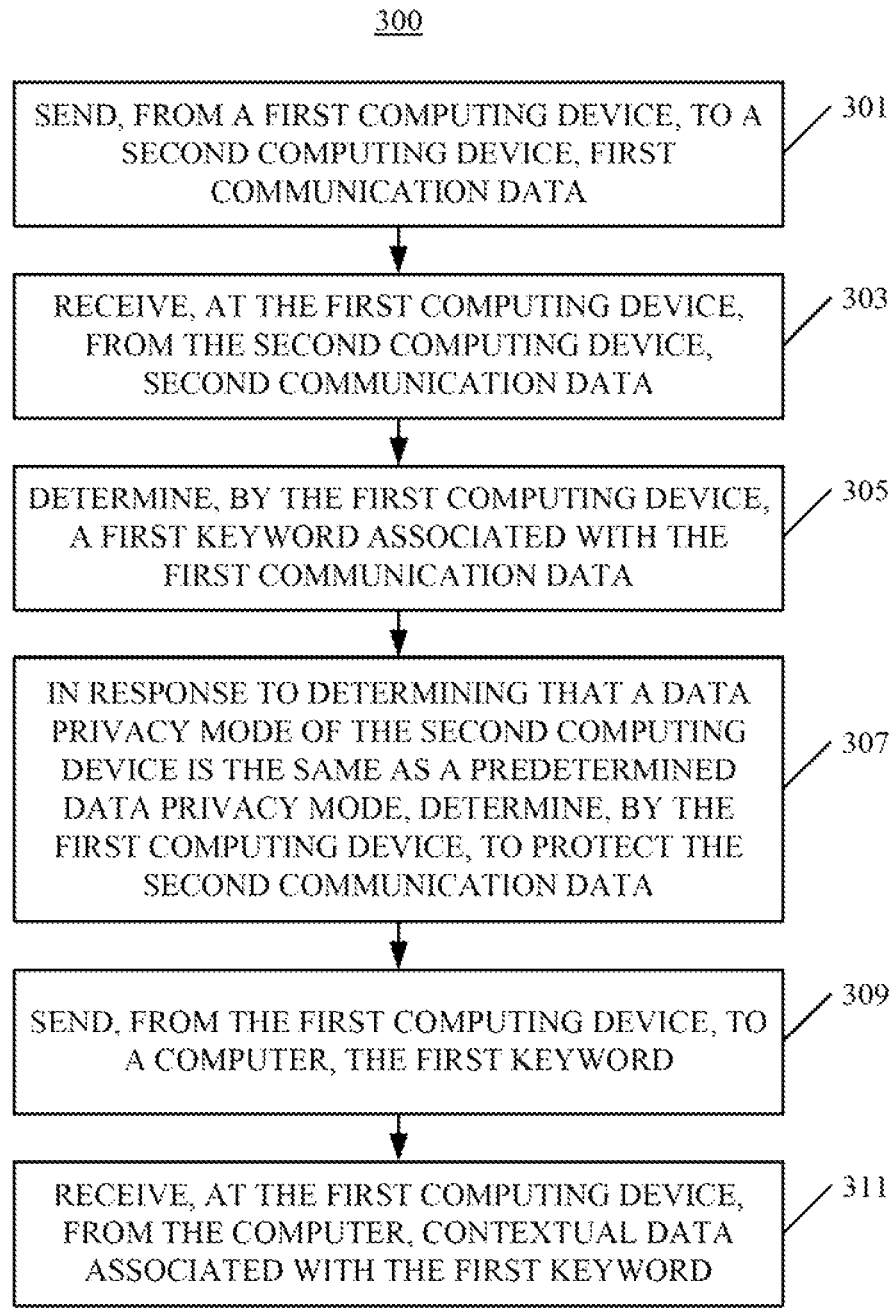
FIG. 3 is a flowchart of one embodiment of a method for improved delivery of contextual data to a computing device while preserving data privacy with various aspects described herein.

FIG. 3 is a flowchart of one embodiment of a method 300 for improved delivery of contextual data to a computing device while preserving data privacy with various aspects described herein. In FIG. 3, the method 300 may begin at, for instance, block 301, where it may include sending, from a first computing device, to a second computing device, first communication data. At block 303, the method 300 may include receiving, at the first computing device, from the second computing device, second communication data. At block 305, the method 300 may include determining, by the first computing device, a first keyword associated with the first communication data. In response to determining that a data privacy attribute of the second computing device is the same as a predetermined data privacy attribute, at block 307, the method 300 may include determining, by the first computing device, to protect the second communication data. In one example, the predetermined data privacy attribute may correspond to the second communication data being private data. At block 309, the method 300 may include sending, from the first computing device, to a computer such as a server, the first keyword. At block 311, the method 300 may include receiving, at the first computing device, from the computer, contextual data associated with the first keyword.

Figure 4:
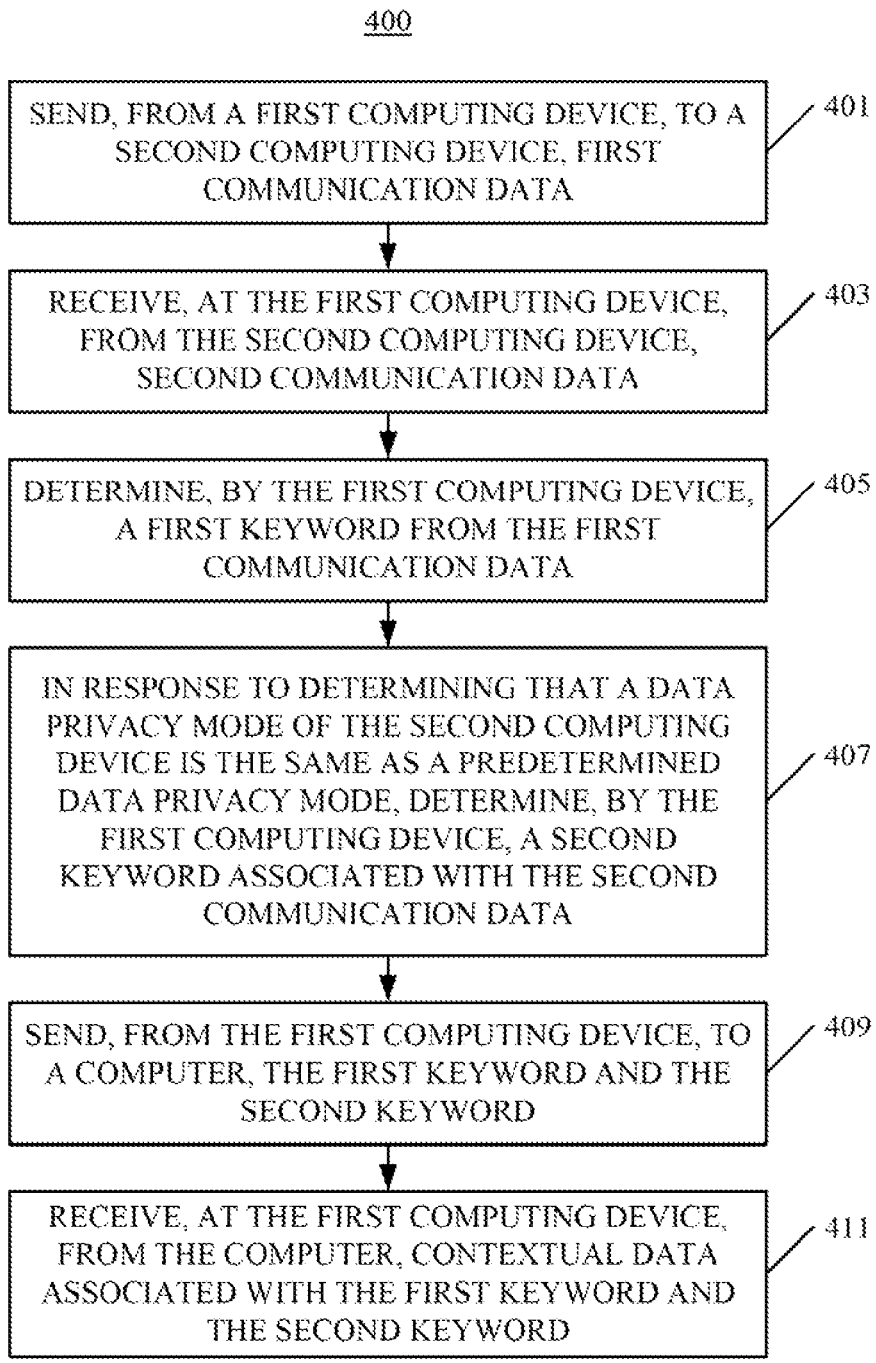
FIG. 4 is a flowchart of another embodiment of a method for improved delivery of contextual data to a computing device while preserving data privacy with various aspects described herein.

FIG. 4 is a flowchart of another embodiment of a method 400 for improved delivery of contextual data to a computing device while preserving data privacy with various aspects described herein. In FIG. 4, the method 400 may begin at, for instance, block 401, where it may include sending, from a first computing device, to a second computing device, first communication data. At block 403, the method 400 may include receiving, at the first computing device, from the second computing device, second communication data. At block 405, the method 400 may include determining, by the first computing device, a first keyword associated with the first communication data. In response to determining that a data privacy attribute of the second computing device may be the same as a predetermined data privacy attribute, at block 407, the method 400 may include determining, by the first computing device, a second keyword from the second communication data. In one example, the predetermined data privacy attribute of the second computing device may correspond to the second communication data being non-private data. At block 409, the method 400 may include sending, from the first computing device, to a computer, the first keyword and the second keyword. At block 411, the method 400 may include receiving, at the first computing device, from the computer, contextual data associated with the first keyword and the second keyword.

In another embodiment, for a second computing device operating with data privacy, a first computing device may apply a privacy filter to a first set of text converted from first communication data by extracting any text from the first set of text that repeats or is substantially similar to text from a second set of text converted from second communication data. Therefore, any data from the first communication data that is substantially similar to the second communication data may be removed. Similarly, any data from the second communication data that may be repeated by a user of the first computing device and reflected in the first communication data may be removed. By doing so may preserve the privacy of the second computing device.

In another embodiment, a method may include receiving, by a first computing device, an indication of a command. In one example, a command may be a voice command, a gesture, a key entry, or the like. In response to the command being a predetermined command, the method may include determining, by the first computing device, a first keyword associated with first communication data or a second keyword from second communication data. In one example, the predetermined command may be a predetermined voice command, a predetermined gesture, a predetermined key entry, or the like.

In another embodiment, a method may include determining a first keyword associated with first communication data by converting the first communication data to a first set of text and determining the first keyword from the first set of text.

In another embodiment, a method may include receiving, at a first computing device, from a second computing device, a data privacy attribute of the second computing device. Further, the method may include determining, by the first computing device, that the data privacy attribute of the second computing device may be the same as a predetermined data privacy attribute.

In another embodiment, a method may include determining to protect second communication data by not converting the second communication data to a second set of text.

In another embodiment, a method may include determining to protect second communication data by not extracting any keywords from a second set of text converted from the second communication data.

In another embodiment, a method may include determining to protect second communication data by not extracting any keywords from the second communication data.

In another embodiment, a method may include converting, by a first computing device, second communication data to a second set of text. Further, the method may include determining, by the first computing device, a second keyword from the second set of text.

In another embodiment, a method may include receiving, by a first computing device, from a computer, a request to send contextual data associated with a first keyword or a second keyword to a second computing device. Further, in response to the request, the method may include sending, by the first computing device, to the computer, an authorization to send the contextual data associated with the first keyword or the second keyword to the second computing device.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. This disclosure is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," "contains . . . a" or the like does not, without more constraints, preclude the existence of additional identical elements in the process, method, article, or apparatus that comprises, has, includes, contains the element. The terms "a," "an," and "the" are defined as one or more unless explicitly stated otherwise herein. The term "or" is intended to mean an inclusive or unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A device or structure that is "configured" in a certain way is configured in at least that way, but may also be configured in ways that are not listed.

Furthermore, the term "connected" means that one function, feature, structure, component, element, or characteristic is directly joined to or in communication with another function, feature, structure, component, element, or characteristic. The term "coupled" means that one function, feature, structure, component, element, or characteristic is directly or indirectly joined to or in communication with another function, feature, structure, component, element, or characteristic. References to "one embodiment," "an embodiment," "example embodiment," "various embodiments," and other like terms indicate that the embodiments of the disclosed technology so described may include a particular function, feature, structure, component, element, or characteristic, but not every embodiment necessarily includes the particular function, feature, structure, component, element, or characteristic. Further, repeated use of the phrase "in one embodiment" does not necessarily refer to the same embodiment, although it may.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches may be used. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

This detailed description is merely illustrative in nature and is not intended to limit the present disclosure, or the application and uses of the present disclosure. Furthermore, there is no intention to be bound by any expressed or implied theory presented in the preceding field of use, background, or this detailed description. The present disclosure provides various examples, embodiments and the like, which may be described herein in terms of functional or logical block elements. Various techniques described herein may be used for improved delivery of contextual data to a computing device while preserving data privacy. The various aspects described herein are presented as methods, devices (or apparatus), systems, or articles of manufacture that may include a number of components, elements, members, modules, nodes, peripherals, or the like. Further, these methods, devices, systems, or articles of manufacture may include or not include additional components, elements, members, modules, nodes, peripherals, or the like. Furthermore, the various aspects described herein may be implemented using standard programming or engineering techniques to produce software, firmware, hardware, or any combination thereof to control a computing device to implement the disclosed subject matter. The term "article of manufacture" as used herein is intended to encompass a computer program accessible from any computing device, carrier, or media. For example, a non-transitory computer-readable medium may include: a magnetic storage device such as a hard disk, a floppy disk or a magnetic strip; an optical disk such as a compact disk (CD) or digital versatile disk (DVD); a smart card; and a flash memory device such as a card, stick or key drive. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the claimed subject matter.

What is claimed is:

1. A method, comprising:
    sending, by a first computing device, to a second computing device, first communication data;
    receiving, by the first computing device, from the second computing device, second communication data;
    in response to determining that a data privacy attribute of the second computing device is equivalent to a predetermined data privacy attribute, protecting, by the first computing device, the second communication data, by at least:
        converting, by the first computing device, the first communication data to a first set of text;
        converting, by the first computing device, the second communication data to a second set of text; and
        applying, by the first computing device, a privacy filter to the first set of text to generate a first filtered set of filtered text by removing from the first set of text, any text that is repeated in the second set of text;
    determining, by the first computing device, a first keyword from the filtered set of text;
    sending, by the first computing device, to a third computing device, the first keyword; and receiving, by the first computing device, from the third computing device, contextual data associated with the first keyword.

2. The method of claim 1, further comprising:
receiving, by the first computing device, an indication of a command, wherein the first keyword associated with the first communication data is determined in response to determining that the command is a predetermined command.

3. The method of claim 1, wherein each of the first communication data and the second communication data is speech data.

4. The method of claim 1, wherein each of the first communication data and the second communication data is text data.

5. The method of claim 1, wherein the predetermined data privacy attribute indicates that the second communication data is private data.

6. The method of claim 1, further comprising receiving, by the first computing device, from the second computing device, the data privacy attribute of the second computing device.

7. A first device, comprising:
a memory configured to store data and computer-executable instructions; and
a processor operatively coupled to the memory, wherein the processor and memory are configured to:
send, to a second device, first communication data;
receive, from the second device, second communication data;
in response to determining that a data privacy attribute of the second portable communication device is equivalent to a predetermined data privacy attribute, protect the second communication data by at least:
converting the first communication data to a first set of text;
converting the second communication data to a second set of text; and
applying a privacy filter to the first set of text to generate a filtered set of text by removing from the first set of text any text that is repeated in the second set of text;
determine a first keyword from the filtered set of text;
send, to a third computing device, the first keyword; and
receive, from the third computing device, contextual data associated with the first keyword.

8. The first device of claim 7, further comprising an input device operationally coupled to the processor, wherein the processor and memory are further configured to:
receive, from the input device, an indication of a command; and
determine the first keyword associated with the first communication data in response to determining that the command is a predetermined command.

9. The first device of claim 7, wherein each of the first communication data and the second communication data is speech data.

10. The first device of claim 7, wherein each of the first communication data and the second communication data is text data.

11. The first device of claim 7, wherein the predetermined data privacy attribute indicates that the second communication data is private data.

12. The first device of claim 7, wherein the processor and memory are further configured to receive, from the second device, the data privacy attribute of the second device.

13. A method, comprising:
sending, by a first computing device, to a second computing device, first communication data;
receiving, by the first computing device, from the second computing device, second communication data;
determining, by the first computing device, a first keyword associated with the first communication data;
sending, by the first computing device, to a third computing device, the first keyword;
determining, by the first computing device, that the second computing device has data privacy disabled in response to determining that a data privacy attribute of the second computing device is equivalent to a predetermined data privacy attribute;
responsive to determining that the second computing device has data privacy disabled:
determining, by the first computing device, a second keyword associated with the second communication data; and
sending, by the first computing device, to the third computing device, the second keyword; and
receiving, by the first computing device, from the third computing device, contextual data associated with the first keyword and the second keyword.

14. The method of claim 13, further comprising:
receiving, by the first computing device, an indication of a command, wherein the first keyword associated with the first communication data and the second keyword associated with the second communication data are each determined in response to determining that the command being is a predetermined command.

15. The method of claim 13, wherein each of the first communication data and the second communication data is speech data.

16. The method of claim 13, wherein each of the first communication data and the second communication data is text data.

17. The method of claim 13, wherein the predetermined data privacy attribute of the second computing device indicates that the second communication data is non-private data.

18. The method of claim 13, wherein determining the first keyword associated with the first communication data includes:
converting the first communication data to a first set of text; and
determining the first keyword from the first set of text.

19. The method of claim 13, wherein determining the second keyword from the second communication data includes:
converting the second communication data to a second set of text; and
determining the second keyword from the second set of text.

20. The method of claim 13, wherein determining that the data privacy attribute of the second computing device is equivalent to the predetermined data privacy attribute includes:
receiving, by the first computing device, from the second computing device, the data privacy attribute of the second computing device; and
determining, by the first computing device, that the data privacy attribute of the second computing device is equivalent to the predetermined data privacy attribute.

21. The method of claim 13, further comprising:
outputting, by the first computing device, for display, an indication of the contextual data.

22. The method of claim 13, further comprising:
receiving, by the first computing device, from the third computing device, a request to send the contextual data associated with the first keyword and the second keyword to the second computing device; and responsive to receiving the request, sending, by the first computing device, to the third computing device, an authorization to send the contextual data associated with the first keyword and the second keyword to the second computing device.

23. A first device, comprising:
a memory configured to store data and computer-executable instructions; and
a processor operatively coupled to the memory, wherein the processor and memory are configured to:
send, to a second portable communication device, first communication data;
receive, from the second portable communication device, second communication data;
determine a first keyword associated with the first communication data;
send, to a third computing device, the first keyword;
determine that the second computing device has data privacy disabled in response to determining that a data privacy attribute of the second portable communication device is equivalent to a predetermined data privacy attribute;
responsive to determining that the second computing device has data privacy disabled:
determine a second keyword associated with the second communication data; and
send, to the third computing device, the first keyword and the second keyword; and
receive, from the third computing device, contextual data associated with the first keyword and the second keyword.

24. The first device of claim 23, further comprising an input device operationally coupled to the processor, wherein the processor and memory are further configured to:
receive, from the input device, an indication of a command; and
determine the first keyword associated with the first communication data and the second keyword associated with the second communication data in response to determining that the command is a predetermined command.

25. The first device of claim 23, wherein each of the first communication data and the second communication data is speech data.

26. The first device of claim 23, wherein each of the first communication data and the second communication data is text data.

27. The first device of claim 23, wherein the predetermined data privacy attribute of the second computing device indicates that the second communication data is non-private data.

28. The first device of claim 23, wherein the processor and memory are further configured to:
convert the first communication data to a first set of text; and
determine the first keyword from the first set of text.

29. The first device of claim 23, wherein the processor and memory are further configured to:
convert the second communication data to a second set of text; and
determine the second keyword from the second set of text.

30. The first device of claim 23, wherein the processor and memory are further configured to:
receive, from the second portable communication device, the data privacy attribute of the second portable communication device; and
determine that the data privacy attribute of the second portable communication device is equivalent to the predetermined data privacy attribute.

31. The first device of claim 23, further comprising a display operationally coupled to the processor, wherein the processor and memory are further configured to output, for display at the display, an indication of the contextual data.

32. The first of claim 23, wherein the processor and memory are further configured to:
receive, from the third computing device, a request to send the contextual data associated with the first keyword and the second keyword to the second portable communication device; and
responsive to the request, send, to the third computing device, an authorization to send the contextual data associated with the first keyword and the second keyword to the second device.

* * * * *